April 24, 1934.   L. P. LYON   1,955,754
FLUID FLOW INDICATOR
Filed June 16, 1932   3 Sheets-Sheet 1
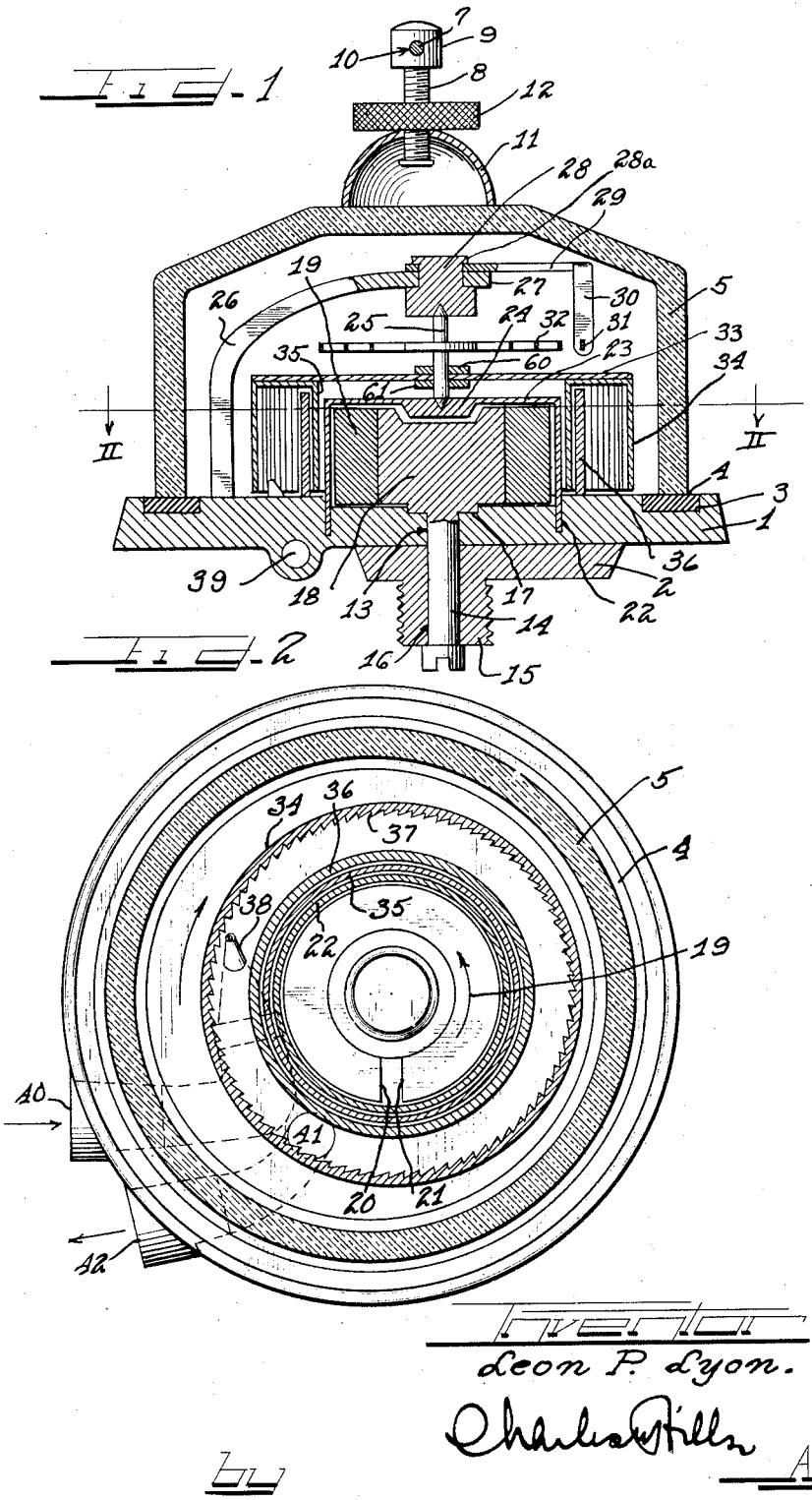
Leon P. Lyon.

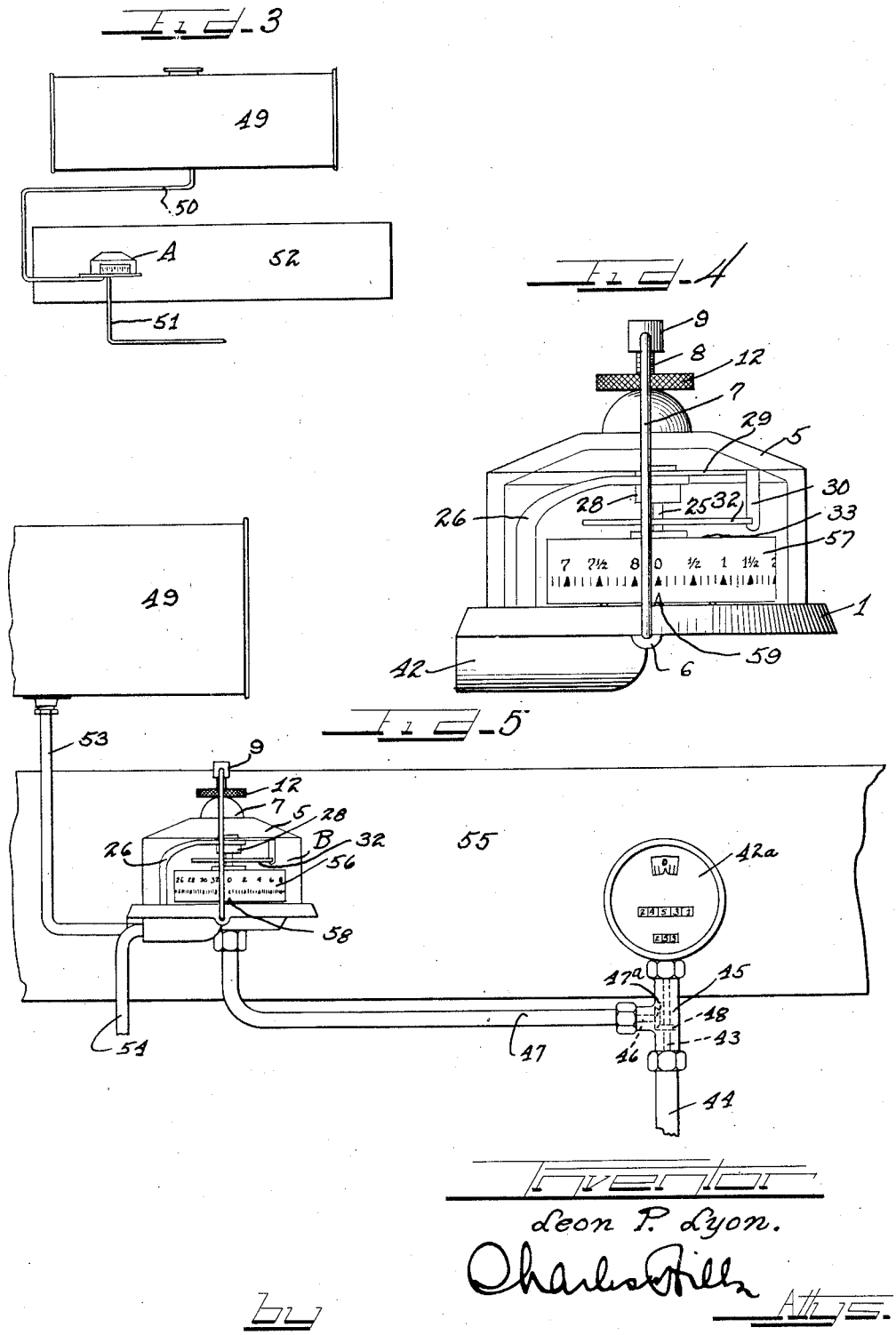

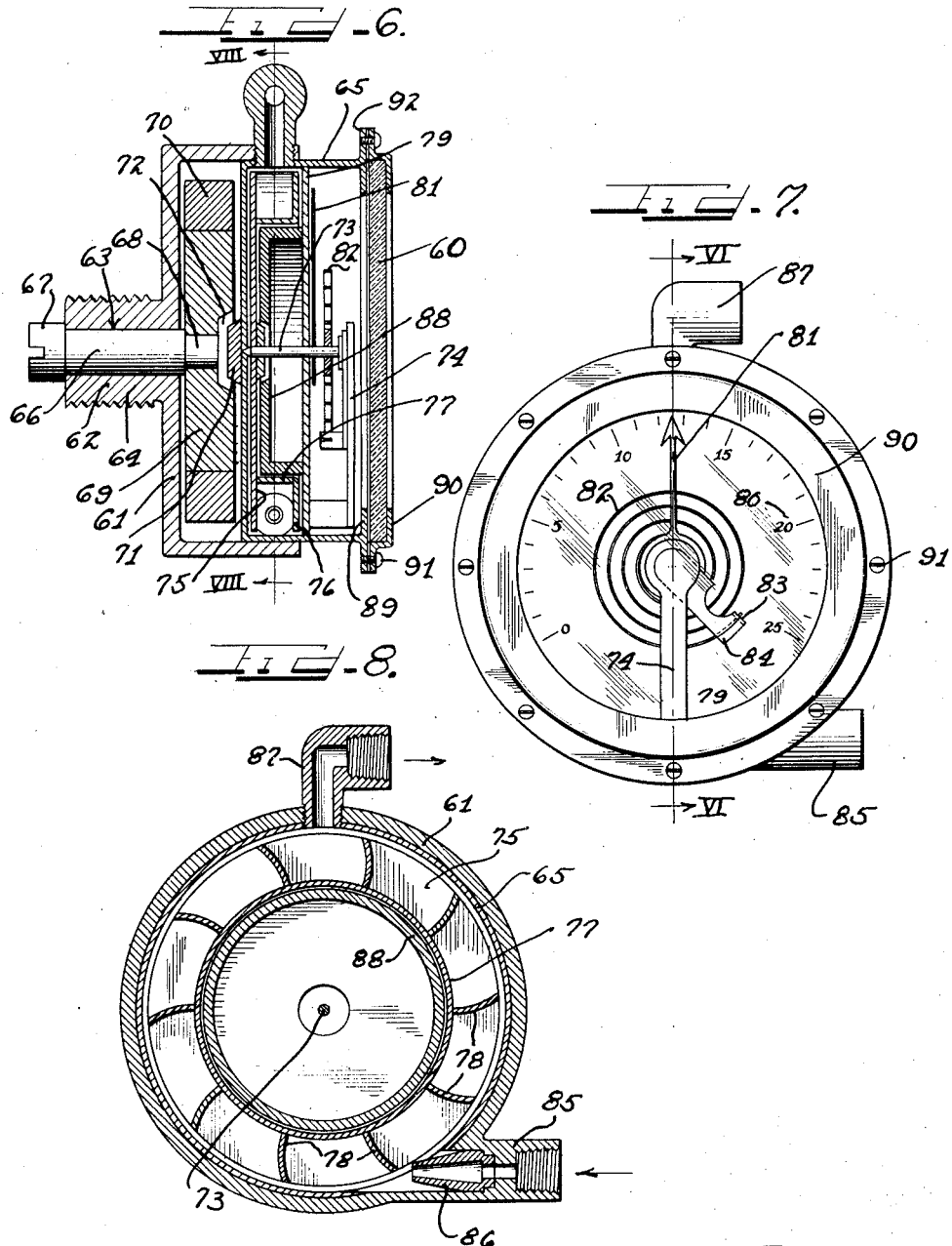

Patented Apr. 24, 1934

1,955,754

UNITED STATES PATENT OFFICE 1,955,754

FLUID FLOW INDICATOR

Leon P. Lyon, Miami Beach, Fla.

Application June 16, 1932, Serial No. 617,613

12 Claims. (Cl. 235—1)

The present invention relates to fluid flow indicators and more particularly to indicators used in connection with internal combustion engines to indicate fuel consumption per hour, or when applied to automotive vehicles, for indicating miles per gallon or the like.

An object of the present invention is to provide a fuel flow indicator readily applicable to the fluid supply lines of internal combustion engines for indicating fuel consumption of such engines measured in some units, for instance, as miles per gallon or gallons per hour.

Another object of the invention is to provide a fuel flow indicator which is simple in construction, efficient in use, and economical to manufacture.

A further object of the invention is to provide a fuel flow indicator which is readily adaptable to measuring the flow of liquid and gaseous fluids.

A further object of the invention is to provide a flow meter or indicator which, in one form, is adapted to measure quantities of flow through pipes of both liquid and gaseous fluids, and in another form, is adaptable to automotive vehicles for indicating fuel consumption in miles per gallon or in some other desirable form of measurement.

Generally speaking, the invention contemplates a disc, subject to movement by the passage of fuel from a fuel supply to an internal combustion engine, which disc movement may be calibrated to represent gallons per hour or any other unit of fuel consumption per unit of time, or may be calibrated to represent miles per gallon where the indicator is applied to an automotive vehicle. The disc may be arranged to move a pointer over a fixed calibrated dial, if desired.

The above, other and further objects of the invention will be apparent from the following description, accompanying drawings, and appended claims.

Embodiments of the present invention are illustrated in the accompanying drawings and the views thereof are as follows:

Figure 1 is a vertical sectional view through a fuel flow indicator embodying principles of the present invention adapted for application to an automotive vehicle for measuring miles per gallon of fuel consumed.

Figure 2 is a horizonal sectional view taken substantially in the plane of line II—II of Figure 1.

Figure 3 is a schematic drawing showing a simple form of attaching the fuel flow indicator in a fuel supply line from a gravity tank to an internal combustion engine.

Figure 4 is a side elevational view of an indicator embodying principles of the present invention and calibrated to show gallons per hour of fluid passage through the indicator.

Figure 5 is a schematic view showing one suggestion for driving the permanent magnet utilized in the indicator of the present invention when applied to automotive vehicles.

Figure 6 is a vertical sectional view, taken substantially in the plane of line VI—VI of Figure 7, of another form of indicator.

Figure 7 is a front elevation of another form of indicator.

Figure 8 is a vertical sectional view taken substantially in the plane of line VIII—VIII of Figure 6.

By "automotive vehicles" is meant automobiles, trucks, aeroplanes, and motor boats. The indicators of the present invention are readily adapable to stationary internal combustion engines and the indicator of Figure 4 is readily applicable to pipe lines for measuring fluid passage therethrough both of liquid and gaseous fluids.

The drawings will now be explained.

Figures 1, 2, 6, 7 and 8 illustrate fuel flow indicators arranged for application to automotive vehicles to indicate miles per gallon of fuel consumption.

The arrangement of Figures 1 and 2 includes the base 1 supported on a bracket 2 for attachment to the automotive vehicle in a place convenient for observation by the operator of such vehicle, such, for instance, on or adjacent the instrument board of an automobile. The base 1 is illustrated as circular for convenience. Within the upper face of the base 1 is an annular recess 3 in which is supplied a gasket 4 of suitable material for cooperating with a transparent casing 5 to make the connection between the casing 5 and the base 1 leakproof. The gasket 4 may be cork or of any other suitable material.

On opposite sides of the base 1 are ears 6 with which communicate the ends of a bail 7. A bolt 8 having a head 9 thereon is attached to the bail 7. The head 9 is apertured at 10 to receive the bail. A resilient cup washer 11 is attached to the bolt 8 and a knurled nut 12 is threaded onto the bolt outwardly of the cup. The bail 7, bolt 8, and cup 11 cooperate to retain the glass housing 5 against the base 1 when the parts are assembled. Figure 1 illustrates the arrangement of parts when fully assembled and the cup 11 is forced against the casing 6 by the nut 12 to hold the parts together.

The base 1 is apertured at 13 to receive a shaft 14. The bracket 2 is provided with a boss 15 as an integral part of the bracket, which boss is apertured at 16 to receive the shaft 14. The base 1 is counterbored at 17 to form a seat for a head 18 preferably integrally formed with the shaft 14. Attached to and surrounding the head 18 is a ring magnet 19 having its ends 20 and 21 spaced as illustrated at Figure 2 and separated a slight distance.

Surrounding the magnet 19 is a shell 22 having its closed end 23 above the base 1. The end or head 23 of the shell is preferably thickened centrally thereof as at 24 to form a bearing for a spindle 25.

Suitably attached to the base 1 is an overhanging arm 26 having an end 27 disposed above the shell and its head 23 and apertured to receive a bearing block 28. The spindle 25 is supported between the enlargement 24 of the head 23 and the bearing block 28 carried by the arm 26. The bearing member 28 is preferably of metal and after it is applied to the aperture in the end 27 of the arm 26 an arm 29 is inserted over the upper end of this member and then the member peened over at 28ª to connect the arm and bearing member to the overhanging arm 26. The arm 29 is movable about the bearing member 28 and is frictionally retained between said member and the overhanging arm 26. The arm 29 has a depending part 30 to the lower end of which is attached at 31 one end of a spiral spring 32. The other end of the spiral spring 32 is attached to the spindle 25 and the spring and spindle operate much in the same manner as a watch spring and shaft. Swinging the arm 29 in one direction tends to tighten the spring 32 and moving it in the opposite direction unwinds the spring 32. In this manner the tension of the spring 32 is adjusted to accommodate the movement of the spindle 25 for a purpose to be now explained.

Fastened to the spindle 25 below the spring 32 is a disc 33 preferably of aluminum. The disc 33 is fastened to the spindle 25 to move with it, being fastened with a key, set screw, or any suitable means.

The disc 33 carries a double ring structure including an outer circular wall 34 and an inner circular wall 35; preferably the walls 34 and 35 are formed from a single piece of metal and suitably fastened to the disc. The walls 34 and 35 are spaced as may be seen in the drawings.

Secured to the base 1 in any suitable manner is a circular baffle wall 36 which in the form of the invention illustrated in Figures 1 and 2 becomes a fixed magnetic pole piece. The baffle wall 36 is disposed between the inner wall 35 and the outer wall 34 attached to the disc 33 and preferably nearer the inner wall 35.

The inner surface of the outer wall 34 of the disc is provided with a plurality of vanes 37.

The inner and outer walls 35 and 34 of the disc 33 together with the wall 36 constitute an annular channel.

Arranged to discharge into the annular channel so formed is an inlet nozzle 38 connected by a duct 39 with a coupling 40 to which is connected the fuel supply line from the source of supply. The nozzle 38 is so disposed as to direct its discharge against the vanes 37 to move the disc 33 and its depending walls or skirts 34 and 35. The parts are so arranged that fluid discharge from the nozzle 38 tends to move the disc and its depending portions or skirts 34 and 35 clockwise as viewed in Figure 2. The exterior of the outer portion or skirt 34 is provided with indicia as shown in Figure 5 to indicate in the present instance miles per gallon of fuel consumed.

Communicating with the channel is an outlet opening 41 forming entrance to an outlet connection 42 to which is connected a pipe leading to the carburetor of/or the internal combustion engine with which the indicator of the present invention is connected.

Figure 5 illustrates schematically one manner of rotating the shaft 14 and its attached ring magnet 19.

In Figure 5 a speedometer 42ª is driven by a flexible shaft 43 carried in a casing 44, which shaft is connected to a wheel of the vehicle or else to the transmission shaft as is common practice.

An adapter 45 is supplied between the flexible shaft casing 44 and the speedometer 42ª to receive a flexible shaft 46 carried within a casing 47. The shaft 46 has a beveled gear 47ª meshing with a beveled gear 48 within the adapter and connected to the flexible shaft 43. The flexible shaft 46 within the casing 47 is connected to the shaft 14 of the indicator for rotating the permanent magnet 19 whenever the speedometer shaft 43 is driven by movement of the vehicle.

Figures 3 and 5 illustrate schematically one means for supplying fuel to the fuel flow indicator of the present invention.

Figure 3 at 49 discloses a gravity fuel tank from which leads a pipe 50 connected to the inlet of the indicator A. A pipe 51 leads from the outlet connection of the indicator A to the carburetor of/or the internal combustion engine of the motor vehicle. The indicator A may be suitably mounted on the instrument board 52 of the vehicle.

Figure 5 illustrates a similar gravity tank 49 connected by a pipe 53 to the inlet connection 40 of the discharge nozzle 38 and a pipe 54 leading from the outlet connection 42 to a carburetor of/or the internal combustion engine. The fuel flow indicator B is illustrated as suitably mounted on the instrument board 55 which carries the speedometer 42ª.

The indicator illustrated in Figure 4 is the same as that illustrated in Figures 1 and 2 with the exception of the elimination of the shaft 14 and the rotatable permanent magnet 19. The oscillatable disc is calibrated in gallons per hour, or any other measure relative to time. The indicator of Figure 4 may be applied to automotive vehicles to indicate fuel consumption in gallons per hour without respect to the speed of the vehicle. The indicator of Figure 4 may also be applied to pipe lines conveying liquid as well as gaseous fluids for measuring the passage of fluid in any unit period of time such for instance as gallons per hour or any other suitable form of calibration.

The shaft 14 and its attached permanent magnet 19 are arranged to rotate in counterclockwise direction as observed in Figure 2. The spring 32 attached to the spindle 25 tends to oppose rotation of the spindle 25 and the connected disc 23 under influence of the impulse given thereto by the fluid discharge from the nozzle 38. Adjustment of the tension of the spring 32 by movement of the arm 29 is made so that the balancing of the forces imparted to the disc 33 under influence of the magnet 19 and the impulse by the fluid is effected so that the movement of the disc and its attached calibrated dial will correctly represent fuel passage through the indicator. In the type not utilizing the rotating permanent magnet 19 balancing of the forces is secured by adjustment of the spring 32.

In the form of indicator illustrated in Figure 4, the spring 32 is heavier than the spring 32 utilized with that illustrated in Figures 1 and 2 for the reason that in the indicator of Figure 4 there is no permanent magnet to oppose movement of the disc and calibrated dial by influence of the discharged fluid from the nozzle.

In the operation of the indicator as herein illustrated, fuel is admitted to the nozzle 38 where it is discharged with velocity head against the vanes 37 thus tending to rotate the disc 33 in clockwise direction as viewed in Figure 2. Movement of the vehicle causes rotation of the permanent magnet 19 in counterclockwise direction thus tending to turn the disc 33 in counterclockwise direction. The balancing of the forces imparted to the disc through the magnet, the spring 32, and the velocity head of the discharged fluid enables prevalence of the force resulting from the discharged fluid to rotate or oscillate the disc in clockwise direction. The amount of movement of the disc is slight as the device is so arranged and adjusted to compensate for the passage of fuel through the indicator and correctly represents the amount of fuel so passing as consumed in the engine.

When in use, the entire indicator within the transparent casing 5 is filled with fuel.

The fuel enters the channel formed between the skirts 34 and 35 of the disc being discharged through the nozzle 38 substantially tangentially against the vanes 37 thus tending to turn the disc in clockwise direction. The confinement of the fuel as discharged from the nozzle 38 through the channel described prevents passage of the discharged fuel to the outlet 41 until it has acted against the vanes 37 of the disc. The incoming fuel from the nozzle 38 is caused to travel in the channel described and any excess of course enters the casing until the same is full. Withdrawal of fuel through the outlet connection 42 continues as long as the engine is in operation thus causing entry of additional fuel to the indicator from the fuel supply.

The dial 56 illustrated in Figure 5 is the dial appearing on the outer surface of the skirt 34 of the arrangement of Figure 1 and is calibrated in miles per gallon. The dial 57 of the form illustrated in Figure 4 is calibrated in gallons per hour.

The nozzle 38 may be made of sufficient size to accommodate the indicator to various gravity heads and to the different installations of internal combustion engines and the fuel supply to such engines. The disc 33 and attached dial are readily interchangeable to provide the desired calibration.

When it is desired to gain access to the interior of the casing 5, the nut 12 is loosened and the bail 7 swung about its ears 6 away from the casing 5 whereupon the casing may be removed and any of the parts adjusted or replaced as the case may demand.

The base 1 may be provided with a pointer 58 to cooperate with the dial 56 for reading the same. The base 1 of the form illustrated in Figure 4 may be provided with a like pointer 59 for the same purpose.

The disc 33 may be secured to the spindle 25 by clamp plates 60 and 61 which may be riveted or otherwise secured to the disc and suitably fastened to the spindle.

The reading of the dial is taken by looking through the glass casing 5 and observing the point of the dial in register with the pointer 58 or 59 as the case may be.

The indicators may be made of various sizes and can be adapted to the amount of fuel utilized in various automotive vehicles in accordance with the size and fuel consumption of various internal combustion engines.

The inside of the outer skirt 34 of the disc 33 is shown as provided with vanes 37. Paddles or blades might be substituted for the vanes if desired.

The arrangement illustrated in Figures 1 and 2 shows a stationary pole piece 36 and a rotating permanent magnet. If desired, the parts might be reversed with the magnet as stationary and pole piece as the rotating member.

Figures 6, 7 and 8 illustrate an indicator having principles of the present invention which is preferably inserted in an opening in the instrument board so that the glass cover plate 60 will be substantially flush with, or lie behind the plane of the face of the instrument board.

The indicator as illustrated in these figures includes a casing 61 having a boss 62 integrally formed therewith which boss is provided with a bore 63. The boss is threaded at 64 exteriorly of the same to receive a casing 47 carrying the flexible shaft 46 for driving the rotatable magnet.

The casing 61 is cylindrical and carries within it the indicator casing 65. The casing 65 may be of brass or non-magnetic metal as desired.

A stub shaft 66 extends through the bore 63 of the boss 62 and has its outer end provided with a head 67 for connection with a flexible shaft 46 for driving it. The inner end of the shaft 66 is illustrated as reduced in diameter at 68 where it is connected to a head member 69 about the periphery of which is a ring magnet 70 constructed and arranged as described with reference to the ring magnet 19 of the embodiment of the invention illustrated in Figures 1 and 2. A bearing 71 is secured against the rear wall of the casing 65 and as illustrated extends within a bore 72 formed in the adjacent face of the head 69. A spindle 73 has one end engaging the bearing 71. The other end of the spindle is carried in a bearing supported in a bearing support 74 fastened to the casing 65 in any suitable manner. A disc or rotor 75 is keyed or otherwise fastened to the spindle 73 inwardly of the adjacent wall of the casing 65. This rotor is provided with a portion 76 connected by flanges 77 to the rotor, arranged with the annular portion 76 spaced from the rotor 75, thus forming an annular channel between the rotor 75 and the annular portion 76 has arranged a plurality of vanes 78 which are curved transversely.

A partition member 79 is disposed within the casing 65 adjacent the annular portion 76 of the rotor and spaced therefrom a slight distance. This partition member 79 in cooperation with the rear face of the casing 65 constitutes a channel within which the rotor and its vanes turn. The face of the partition member 79 is provided with indicia or calibrations preferably as miles per gallon as indicated at 80 in Figure 7. When this form of indicator is used without the rotating magnet 70, the indicia on the face of the partition member 79 may be calibrated in gallons per hour.

A pointer 81 is fixed to the spindle 73 and turns with it.

A spiral spring 82 has one end fastened to the spindle 73 and its other end connected as indicated at 83 in Figure 7, to an adjusting lever or arm 84. The arm 84 is retained in position on the support 74 in the same manner as is the arm 29 illustrated and described in connection with Figure 1. That is, the arm has frictional engagement against the support 74 whereby it is retained in any position to which it may be moved for adjusting the tension of the spring 82.

The casing 65 is provided with an inlet connection 85 carrying within it an inlet nozzle 86 arranged to discharge against the vanes 78. At the top of the casing 65 is an outlet connection 87 threaded to receive a pipe for delivering fuel from the indicator to the fuel supply line such for instance as to the carburetor when the indicator is used in an automotive vehicle. Attached to the inner face of the partition member 79 is a pole piece 88 the purpose of which is to amplify the effect of the rotating magnet 70 as the indicator is in use.

The rotor 75 is made preferably of aluminum which metal is but slightly magnetic; consequently, the effect of the rotating magnet 70 on the aluminum rotor or disc 75 is slight. The pole piece 88, therefore, increases the magnetic effect on the aluminum disc 75 by the rotating magnet 70.

A glass plate 60 is fixed in the casing 65 against a flange 89 which is formed as a part of the casing 65. A ring 90 engages against the outer surface of the glass and is attached to the casing by screws or bolts 91 threaded into openings in an annular flange 92 of the casing 65.

The pointer 81 in Figure 7 is shown at approximately mid-position.

In the operation of the form illustrated in Figures 6, 7 and 8, the incoming fuel enters the nozzle 86 and strikes the vanes or buckets 78 and rotates the rotor or disc 75 in clockwise direction as viewed in Figures 7 and 8. The spring 82 is adapted to oppose rotation of the disc in this direction. The ring magnet 70 is actuated by driving connections to the stub shaft 66 to rotate in a counterclockwise direction.

A balancing of forces in this form of the invention is secured in the same manner as described with reference to the form of the invention illustrated in Figures 1 and 2. The rotation of the magnet 70 in counterclockwise direction will tend to oppose movement of the rotor or disc 75 in clockwise direction under influence of the incoming fluid. The spring 82 likewise tends to oppose movement of the disc in clockwise direction under influence of this fluid; consequently, the forces may be so balanced that the incoming fluid will act on the rotor and its vanes as to cause movement thereof in clockwise direction in opposition to the forces tending to oppose it, thus truly representing fluid flow in accordance with the calibrations appearing on the dial of the indicator.

The total inclosure of the indicator and its parts within the casing is preferable because of the fact that the forces acting on the disc to turn it under influence of the incoming fluid are so slight that were the spindle supported in a gland packing to prevent fluid passage therethrough enough resistance would be thus set up to destroy the effectiveness of the indicator. The arrangement of the parts within the casing in the manner described, which casing is filled with fluid when in operation, enables proper functioning of the various elements without unduly creating friction or other resistance tending to nullify the effectiveness of the device.

Aluminum is preferably used as a rotor or disc 80 as it is very light thus responding more readily to the action of the incoming fluid. Aluminum is only slightly magnetic, that is, magnetic to a point which is sufficient for its use in an indicator constructed in accordance with the principles of the present invention. Aluminum is preferably used for the reason that if a stronger magnetic material were used, the action of the rotating magnet on the disc would be too strong thus offering an opportunity for error in the operation of the indicator in service.

The springs connected to the discs or rotors return the same to normal position after flow through the indicators has ceased.

There are in use today in connection with automotive vehicles three types of fuel supply. First is by gravity tanks; second by vacuum tanks; and the third by fuel pumps. In the first and second of these systems the indicator is connected in the fuel line between the gravity or vacuum tank, and the carburetor or engine. In the system using a fuel pump the indicator is connected to the fuel supply line either between the fuel tank and the pump or between the pump and the carburetor or engine. Hence the fuel is supplied to the carburetor or engine under gravity head or under atmospheric head. Where a fuel pump is used, the indicator is placed at the highest point in the line, so that fuel flows to the indicator by atmospheric pressure caused by the suction of the fuel pump.

If desired, the oscillatable dial might be eliminated and an oscillatable pointer employed instead with a stationary dial showing the calibration.

When an indicator of the type utilizing the rotatable magnet is employed in an automotive vehicle, the speed of the rotatable magnet becomes a function of the speed of the vehicle. The passage of fuel through the indicator depends, of course, on the fuel consumption of the vehicle and thus the fuel passage becomes a function of the fuel consumption of the vehicle.

The rotation of the magnet by the movement of the vehicle tends to move the disc or movable member in one direction while the fuel discharged into the indicator under velocity head tends to move the disc or movable member in the opposite direction. A hair spring connected to the disc or movable member is adjustable to so balance the forces imparted to the disc or movable member by the rotatable magnet and the discharged fuel so as to allow the resultant movement of the disc or movable member in the direction of fuel discharge, thus enabling the movement of the disc or movable member to correctly represent fuel consumption in terms of distance traveled, such for instance, in miles per gallon of fuel consumed.

The adjustment of the hair spring is effected to so balance the forces imparted to the disc or movable member for the accomplishment of this purpose.

The forces acting on the disc or movable member are so slight that but a slight resultant movement of the disc or movable member takes place.

The rotation of the rotatable magnet by the speed of the vehicle tends to oppose movement of the disc or movable member by fluid discharge, thus causing the disc or movable member to vary its position in accordance with the vehicle speed and the fuel consumption.

The movement of the disc or movable member by fluid discharged is thus checked or opposed by the rotatable magnet, and these two forces, one a function of the fuel consumption and the other a function of the vehicle speed, may be so balanced by the hair spring that the resultant movement of the disc or movable member correctly represents the fuel consumed in terms of gallons per mile of travel. The greater velocity of fuel discharged, the greater the disc movement or the movement of the movable member.

Aluminum is utilized for the disc or rotatable member for several reasons. One of the reasons is that, because of its light weight, it thus becomes more readily responsive to the slight forces present in the indicator. Another reason is that because of the low magnetic properties or characteristics of aluminum, the disc or movable member thus becomes slightly responsive to the action of the rotating magnet.

It is understood, of course, that the disc or movable member may be composed of an aluminum alloy containing sufficient magnetic properties to operate as desired. The amount of magnetic material in such alloy being determined by the resultant effects desired in the operation of the indicator.

The effect of the rotatable magnet on aluminum is so slight that such effect must be increased and this is accomplished by the use of the pole piece.

The invention has been described herein more or less precisely as to details, yet the invention is not to be limited thereby, as changes may be made in the arrangement and proportion of parts and equivalents may be substituted without departing from the spirit and scope of the invention.

The invention is claimed as follows:

1. A flow indicator, in combination, a casing having a fluid outlet and an inlet, a disc supported for oscillation, said disc having a circular depending part provided with vanes on its inner surface, a circular baffle wall within said casing and with the depending part of said disc forming an annular channel, the inlet being disposed to discharge within said channel and against said vanes to move the disc in one direction, a rotatable magnet rotatable in a direction tending to oppose movement of said disc by said fluid discharge, and spring means tending to oppose movement of said disc by said fluid discharge.

2. A flow indicator comprising a base, a transparent casing removably mounted on said base, an oscillatable disc supported within said casing, an annular wall on said base concentric with said disc, said disc overhanging said wall and having a depending circular part spaced from said wall in a direction away from the disc support, the inner surface of said depending part being provided with vanes, said depending part and wall forming a channel, a fluid discharge nozzle opening into said channel and disposed to discharge substantially tangentially against said vanes to move said disc in one direction, a rotatable magnet rotatable in a direction tending to oppose movement of said disc by said fluid discharge, said base having a fluid outlet opening from said channel, and said channel serving to maintain and contain the fluid in close relation with the vanes while passing to the discharge outlet, and said depending part having indicia thereon for indicating the rate of fluid flow through said indicator.

3. A fuel flow indicator for automotive vehicles comprising a base, a transparent casing removably mounted on said base, a cylindrical shell on said base in inverted position with its closed end above the base, an oscillatable disc operatively concentric with said shell, an annular wall or baffle ring on said base spaced from said shell, said disc overhanging said wall and having a depending circular skirt spaced from said wall in a direction away from said shell, said skirt and wall defining an annular channel, vanes on the inside of the skirt, a fluid discharge nozzle in said channel disposed to discharge fluid against said vanes to move said skirt and disc in one direction, a spring connected to said disc to oppose movement of said disc and skirt by said fluid discharge, the outer surface of said skirt being provided with indicia to indicate the flow of fluid, the movement of the disc by said fluid discharge representing the fluid flow per unit of time.

4. A fuel flow indicator for automotive vehicles comprising a base, a transparent casing removably mounted on said base, a cylindrical shell on said base in inverted position with its closed end adjacent the base, an oscillatable disc supported concentric on said shell, an annular wall or baffle ring on said base spaced from said shell, said disc overhanging said wall and having a depending circular skirt spaced from said wall in a direction away from said shell, said skirt and wall defining an annular channel, vanes on the inside of the skirt, a fluid discharge nozzle in said channel disposed to discharge fluid against said vanes to move said skirt and disc in one direction, a spring connected to said disc to oppose movement of said disc and skirt by said fluid discharge, the outer surface of said skirt being provided with indicia to indicate the flow of fluid, the movement of the disc by said fluid discharge representing the fluid flow per unit of vehicle fuel consumption, and a rotatable magnet within said shell driven from the vehicle in a direction opposite to that in which the disc is moved by said fluid discharge to oppose the movement of said disc by said discharge.

5. A fuel flow indicator, in combination, a base, a transparent casing removably joined to said base, means for securing said casing to said base, a bearing within said casing, an arm overhanging said bearing, a second bearing carried in said arm above said first bearing, a spindle between said bearings, a disc secured to said spindle and movable with it, said disc having vanes thereon and a calibrated dial, a fluid nozzle disposed to discharge fluid against said vanes to move said disc and spindle, a rotatable magnet rotatable in a direction tending to oppose movement of said disc by said fluid discharge, and a spring connected to said spindle operative to oppose movement of said disc and spindle by said fluid discharge and to return the disc to normal position after discharge, said spring being adjustable to vary its opposition to the movement of said disc and spindle by said fluid discharge.

6. A flow indicator including a casing, a movable member therein, means therein constituting a channel, said member having a part thereof in said channel, vanes on said member part within said channel, an inlet nozzle disposed to discharge within said channel and against said vanes for moving said member in one direction, a rotatable magnet rotatable in a direction tending to oppose movement of said member by said fluid discharge, and a spring operatively connected with said member tending to oppose movement of said member by said fluid discharge and to return said member to normal position after discharge.

7. A flow indicator including a movable member of low magnetic characteristics, a rotatable magnet tending to move said member in one direction, a pole piece for increasing the effect of said magnet, a fluid inlet nozzle disposed to discharge fluid against said member in a manner to move it in the opposite direction, the magnetic characteristics of said member being such that the force exerted by said fluid discharge is superior to the force exerted by the magnet whereby said member is moved in the direction imparted to it by the fluid discharge impulse, a calibrated dial, and a pointer connected to said member and movable over said dial as said member is moved.

8. A fuel flow indicator for automotive vehicles, said indicator being connected in the fuel supply line in the direction of fuel flow, said indicator including in combination, a casing having a transparent portion, a movable member of low magnetic properties within said casing, a rotatable permanent magnet responsive to the vehicle speed tending to move said member in one direction, a fluid nozzle disposed to discharge fuel against said member to move it in the opposite direction, a pole piece disposed to increase the magnetic effect of said rotatable magnet on said member, the flow of the fuel through said indicator varying with the vehicle fuel consumption, an adjustable hair spring connected to said member to so balance the forces imparted thereto by said rotatable magnet and said fuel discharge as to permit the movement of said member to represent fuel passage in terms of distance traveled, and a dial and pointer, one of which is connected to said member to cooperate with the other to indicate the resultant reading, the reading being observed through the transparent portion and the intervening fuel.

9. A fuel flow indicator for connection in a fuel line, said indicator including a casing adapted to be completely filled by the fuel passing through the same, said casing having a transparent portion whereby the contents may be observed, a movable member within said casing, said casing having a fuel inlet and a fuel outlet, said inlet being so disposed with respect to said movable member that incoming fuel strikes against said member to move it in the direction of fuel admission, a rotatable magnet rotatable in a direction tending to oppose movement of said movable member by said fluid discharge, means connected to said member tending to oppose movement thereof by said incoming fuel and to return said member to normal position when the fuel flow ceases, the said movable member being calibrated to indicate fuel passage through the indicator, the reading of the calibration being observed through the said transparent portion and the fuel.

10. A fuel flow indicator for automotive vehicles, said indicator being connected in the fuel supply line in the direction of fuel flow, said indicator including in combination, a casing having a transparent portion, a movable member of low magnetic characteristics within said casing, a rotatable permanent magnet responsive to the vehicle speed tending to move said member in one direction, a fluid nozzle disposed to discharge fuel against said member to move it in the opposite direction, a pole piece disposed to increase the magnetic effect of said rotatable magnet on said movable member, the flow of the fuel through said indicator varying with the vehicle fuel consumption, an adjustable hair spring connected to said member to so balance the forces imparted thereto by said first means and said fuel discharge as to permit the movement of said member to represent fuel passage through the indicator in terms of distance traveled, and a dial and pointer one of which is connected to said member to cooperate with the other to indicate the resultant reading, the reading being observed through the transparent portion and the intervening fuel.

11. A fuel flow indicator for vehicles for indicating fuel consumption in terms of distance traveled, said indicator including in combination, an oscillatable member, a fuel discharge nozzle disposed to discharge fuel against said member to move it in one direction, means providing a shiftable magnetic field disposed to subject said member to said field to move said member in the opposite direction, and means for shifting said field in consonance with the vehicle speed.

12. A fuel flow indicator for vehicles for indicating fuel consumption in terms of distance traveled, said indicator including in combination, an oscillatable member, a fuel discharge nozzle disposed to discharge fuel against said member to move it in one direction, means providing a shiftable magnetic field disposed to subject said member to said field to move said member in the opposite direction, and means for shifting said field in consonance with the vehicle speed, and means connected to said oscillatable member for opposing movement thereof by said fluid discharge and to return said member to initial position when said fluid discharge ceases.

LEON P. LYON.